UNITED STATES PATENT OFFICE.

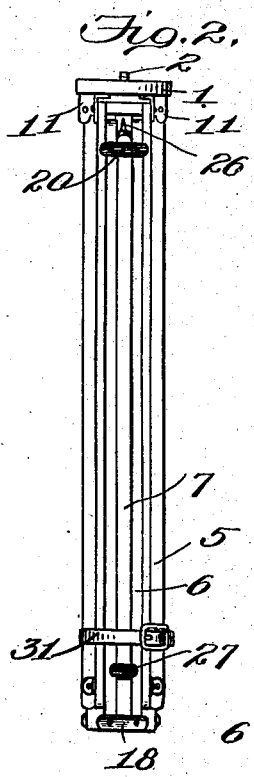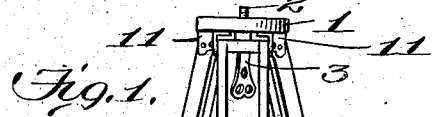

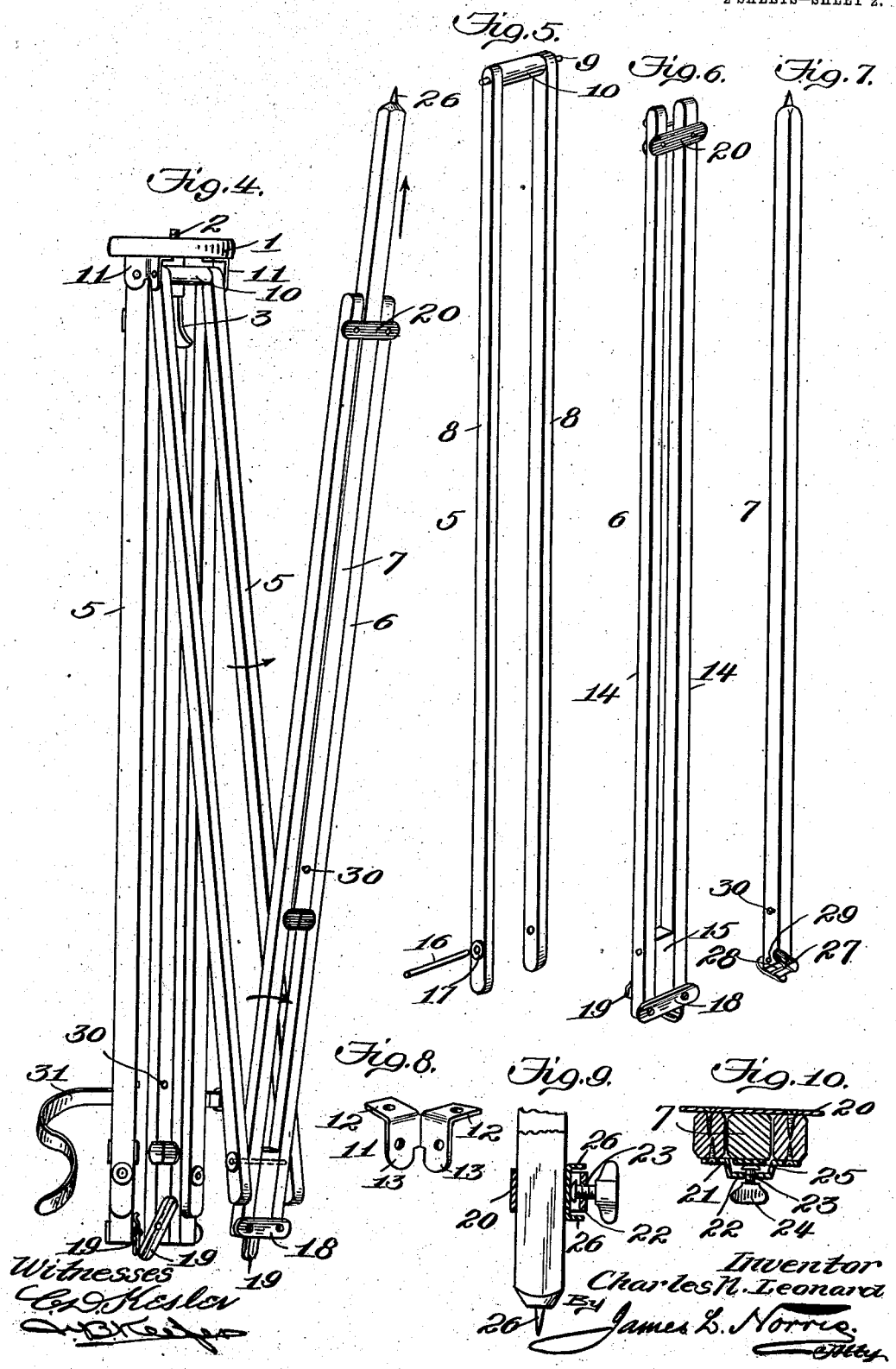

CHARLES N. LEONARD, OF INDIANAPOLIS, INDIANA, ASSIGNOR TO SENECA CAMERA MANUFACTURING COMPANY, OF ROCHESTER, NEW YORK, A CORPORATION OF NEW YORK.

TRIPOD.

No. 894,672.  Specification of Letters Patent.  Patented July 28, 1908.

Application filed March 19, 1908. Serial No. 422,042.

*To all whom it may concern:*

Be it known that I, CHARLES N. LEONARD, a citizen of the United States, residing at Indianapolis, in the county of Marion and State of Indiana, have invented new and useful Improvements in Tripods, of which the following is a specification.

This invention relates to tripods for supporting photographic cameras and other analogous devices, and the primary object of the same is to provide a simple and effective device of this class capable of being compactly folded and of a strong and durable nature.

One of the main advantages of the tripod is its cheapness of construction and the possibility of introducing it in the market at a minimized selling price.

With the foregoing and other objects and advantages in view the invention consists in the construction and arrangement of parts which will be more fully hereinafter specified.

In the drawings: Figure 1 is an elevation of a tripod embodying the features of the invention and shown open and disposed in operative position. Fig. 2 is a similar view showing the tripod folded. Fig. 3 is a bottom plan view of the folded tripod. Fig. 4 is an elevation of a tripod partially unfolded, one of the legs being illustrated in perspective. Figs. 5, 6 and 7 illustrate the components of each leg in detail perspective. Fig. 8 is a detail perspective view of one of the hinge brackets. Fig. 9 is a detail view showing portions of one of the legs and illustrating a holding or clamping means in section. Fig. 10 is a horizontal section through portions of one of the legs showing the holding or clamping means illustrated by Fig. 9.

Similar characters of reference are employed to indicate corresponding parts in the several views.

The tripod essentially includes a table 1 equipped with the usual screw 2 actuated by a thumb-nut 3 or analogous device operative from the under side of the table, and legs 4 movably attached to the table and adapted to be disposed in triangular relation, as will be readily understood, to hold the table 1 and the camera or other device that may be supported thereby at a proper elevation and in desirable position.

Each leg 4 is made up of three components 5, 6 and 7 which may properly be termed an attaching section, an intermediate extension section, and a projectible controlling section operative to dispose the entire tripod in various positions in accordance with the regularity or irregularity of the base support for the tripod and also to regulate the elevation of the table 1. The attaching section 5 of each leg is composed of two members 8 spaced to receive the extension section 6 between them and united at their upper ends by a fulcrum pin or rod 9 extending transversely therethrough and also through a space sleeve or element 10 which serves to maintain the members 8 constantly at a uniform distance apart and also strengthen the upper end of the section 5.

The fulcrum pin or rod 9 is extended outwardly beyond the outer sides of the members 8, and the projecting ends of this pin or rod are fitted in adjacent portions of a fulcrum bracket 11, see Fig. 8, and headed over or riveted to obstruct accidental disengagement and to provide for a simple and inexpensive association of the legs in relation to the brackets and table 1. Each fulcrum bracket 11 comprises horizontal securing members 12 and depending bearing members 13 and primarily constructed from a single flat blank and subsequently bent into the form illustrated by Fig. 8. Three of the brackets 11 are secured to the under side of the table 1 and the upper extremities of the sections 5 are held between contiguous members 13 of each bracket, as clearly shown by Figs. 1 and 4. This bracket provides a very simple means for movably attaching the upper extremities of the sections 5 to the under side of the table 1, and the assemblage of the brackets and table can be very expeditiously carried out.

The extension section 6 is also composed of two members 14, which are held spaced a predetermined distance by a space block 15 interposed between the said members at one extremity of the section. The section 6 is foldable into the section 5, the two sections being hingedly connected by a pin or rod 16 inserted through the members 8 adjacent the ends of the latter opposite to the ends connected by the fulcrum pin or rod 9, the pin 16 passing through the members 14 of the section 6 and the block 15 and headed over at its opposite ends against the outer surfaces of the members 8 of the section 5, suitable washers 17 being interposed between the headed-over ends of the pin 16 and the outer sides of the members 8. A limiting or stop plate 18 is secured against the inner side of the section 6 close to the ends of the members 14, this limiting or stop plate extending transversely over the section 6 and terminally projecting beyond the outer sides of the members 14 to bear against the inner edges of the members 8 of the section 5 when the said section 6 is opened or thrown out into operative position. Secured to the same extremity of the section 6 on the outer side is a turn-button 19 which acts in opposition to the stop plate 18 when adjusted to engage the front edges of the lower extremities of the members 8 of section 5 to lock the section 6 against movement when the legs are opened and as clearly shown by Fig. 1. When it is desired to fold or close the section 6 into the section 5 the turn-button 19 is adjusted to occupy a longitudinal position relatively to the extremity of the section 6 to which it is attached, or is turned sufficiently to disengage the front edges of the members 8 of the section 5. By the use of the stop plate 18 and the turn button 19 an effectual locking means is provided to hold the section 6 rigidly extended when the leg is opened.

At the extremity of the section 6 opposite that carrying the stop plate 18 and turn-button 19 a second limiting or stop plate 20 is secured and arranged in all particulars similar to the stop plate 18 with the exception that it is located inwardly a distance from the adjacent ends of the members 14. This stop plate 20 serves to prevent the section 6 from passing inwardly through the section 5 when said section is folded and also as a guide and retention means for the section 7 in a manner which will be presently explained. Disposed opposite to the stop plate 20 is a clamping means consisting of a transverse clip 21 rigidly secured at its opposite extremities to the members 14 and embodying a central arch 22 formed with a screw-threaded opening 23 engaged by a clamping screw 24 having its inner end normally bearing upon a pressure or clamping plate 25, the opposite ends of this plate being struck up or flanged as at 26 to maintain the plate in place beneath the arch 22.

The plate 25 is loosely held beneath the arch 22 and engages the section 7 which is slidably disposed between the members 14 of the section 6, the said section 7 being projectible any desired distance from the section 6 and firmly held in its projected position by the clamping means just explained. Furthermore, when the section 7 is fully pushed into the section 6 it will be prevented from having loose movement by tightening the pressure or clamping plate 25 thereagainst through the medium of the screw 24. The clamping plate 25 extends longitudinally with relation to the section 6 and also with respect to the section 7 with which it directly coöperates, and when said plate is tightened or caused to impinge against the section 7, the latter at its opposite edge firmly bears and is held in clamped contact with the stop plate 20, the latter thus serving also as a resistance means. The lower extremity of the section 7 is provided with a pointed pin or spike 26, and the opposite end is equipped with guide means consisting of two U-shaped members 27 preferably formed from sheet metal and unitedly inserted and secured in a longitudinal slot 28 in the end of the section 7. The members 27 are prevented from having loose movement and becoming detached by a rivet or fastening pin 29 extending transversely through the portions of the members embedded in the slot 28 and also through the section 7, as clearly shown by Fig. 7. The opposite angular ends of the members 27 project outwardly beyond the side edges of the section 7 and bear upon the front and rear edges of the members 14 of the section 6. This guide means in conjunction with the stop and resistance plate 20 holds the section 7 in proper associated relation to the section 6, the pressure or clamping plate 25 also incidentally acting as a retention means when loose in view of the fact that it always remains in one place or beneath the arch 22 of the clip 21. The projectible section 7 of each leg is prevented from being moved outwardly through the section 6 beyond a predetermined distance by a stud 30 secured thereto adjacent its inner end, said stud being adapted to strike against the inner flanged extremity of the pressure or clamping plate 25.

To the intermediate portion of one of the legs and directly attached to the inner extremity of the projectible section 7 is a securing strap 31 for holding all of the legs in close assemblage when folded, as shown by Fig. 2. By fixing this strap 31 to the section 7 as specified, the adjacent section 6 may be folded into the section 5 to which said section 6 is attached without the least interference. This securing strap remains intact with the leg to which it is applied at all times and is therefore always ready for immediate use.

From the foregoing descripion it will be noted that the sections 5 and 6 of each leg are mainly composed of a pair of members 8 and 14, and the section 7 consists of a single member, all the sections being strongly associated and light in structure, and by having the section 6 foldable into the section 5 and the section 7 slidable into or telescopically arranged with relation to the section 6, each leg may be quickly and conveniently opened and arranged for supporting the table 1 and the camera or other device on the latter, or it may be quickly folded and the complete tripod reduced to compact form for transportation and storage. By having the section 6 hinged to the section 5 and the section 7 telescopically fitted in the section 6, the several components of each leg as just specified are less liable to become jammed and stick and will always be in condition for immediate operation without the least annoyance and inconvenience frequently encountered in tripods now in use.

The slidable section 7 of each leg is approximately of the same length as the extension section 6 so that when the said section 7 is fully inserted or pushed into the section 6 it will not extend beyond the end of the section 6 hinged to the attaching section 5. Furthermore, it will be seen that the maximum width of the section 6 is slightly less than the distance between the side members of the attaching section 5 so as to fold inwardly between the latter members, and this folding operation is pursued from the outer side or portion of each section 5, the stop plates 18 preventing the extension sections 6 from being turned inwardly and folded into the sections 4 from the rear and thus avoid confusion and interference of the sections of each leg in the folding and opening operations. Each section 5 and 6 is rigid throughout its predetermined length or is not intermediately broken at any point by hinged joints.

Having thus fully described the invention, what is claimed as new, is:

1. A tripod comprising an upper supporting member, legs movably connected to the supporting member and each composed of an upper attaching section, an intermediate extension section hinged to and foldable into the upper attaching section, and a projectable foot section telescopically mounted in the extension section, the foot section being approximately of the same length as the extension section and both sections foldable into the upper attaching section from the outer side of the latter, and stop plates and holding devices applied to the opposite sides of the two extremities of the extension section to coöperate with the remaining sections.

2. A tripod comprising an upper supporting member, legs hinged thereto and composed of upper intermediate and lower sections, the lower section being of approximately the same length as and telescopically mounted in the intermediate section and the latter hinged to the upper section and with the lower section foldable into said upper section from the outer side of the latter, and brace and movable holding devices on opposite sides of the two extremities of the intermediate section to coöperate with the remaining sections.

3. A tripod comprising an upper supporting member, legs movably attached to said supporting member and each composed of an upper section, an intermediate section, and a lower section, the intermediate section being hinged to and foldable into the upper section and the lower section approximately of the same length as and telescopically disposed in the intermediate section, the intermediate and lower sections both being foldable into the upper section from the outer side of the latter, a stop plate secured on one side of the end of the intermediate section hinged to the upper section, and a similar plate secured on the reverse side of the intermediate section adjacent to the opposite end of the latter.

4. A tripod comprising an upper supporting member, legs movably attached to said supporting member and each composed of an upper section, an intermediate section, and a lower section, the intermediate section being hinged to and foldable into the upper section and the lower section telescopically disposed in the intermediate section, a stop plate secured on one side of the end of the intermediate section hinged to the upper section, and a turn-button applied to the opposite side of the end of the intermediate section carrying the stop plate, the intermediate and lower sections being unitedly foldable into the upper section from the outer side of the latter and inclosable by the said upper section, the lower section being also inclosable by the intermediate section.

5. A tripod comprising an upper supporting member, legs movably attached to said supporting member and each composed of an upper section, an intermediate section, and a lower section, the intermediate section being hinged to and foldable into the upper section and the lower section telescopically disposed in the intermediate section, a stop plate secured on one side of the end of the intermediate section hinged to the upper section, a turn-button applied to the opposite side of the end of the intermediate section carrying the stop plate, another stop plate on the reverse side of the intermediate section at the opposite end of the latter, the ends of the stop plates projecting outwardly beyond the outer sides of the side members of the intermediate section and movable with the latter section, and a clamping device also disposed on the said opposite end of the intermediate section and on the same side of the said section as the first mentioned stop plate.

6. A tripod comprising an upper supporting member, legs movably attached to said supporting member and each composed of an upper section, an intermediate section hinged to the upper section and foldable into the latter, and a lower section telescopically mounted in the intermediate section, means at the end of the intermediate section hinged to the upper section for holding said intermediate section in operative position when unfolded, a stop plate secured to the opposite end of the intermediate section on one side of the latter, and a clamping means secured to the intermediate section on the side opposite that to which the stop plate is secured and consisting of a clip carrying a clamping screw and a clamping plate loosely held in associated relation to said clip and adapted to impinge against the lower telescopic section.

7. A tripod comprising an upper supporting member, a series of legs movably attached to the supporting member and each composed of upper, intermediate and lower sections, the intermediate section being hinged to the lower end of the upper section and foldable into the latter from the outer side and the lower section telescopically movable into the intermediate section and approximately of the same length as said intermediate section and fully inclosable by the latter, the end of the intermediate section attached to the upper section being closed and preventing the lower section from being pushed therethrough, and means for holding the intermediate and lower sections in fixed operative position when distended.

8. A tripod comprising an upper supporting member, legs movably attached to said supporting member and each composed of an upper section, an intermediate section, and a lower section, the intermediate section being hinged to and foldable into the upper section from the outer side of the latter, and the lower section slidable and fully inclosable within the intermediate section and foldable with the latter into the upper section, means for holding the intermediate section in immovable distended relation to the upper section and to prevent the said intermediate section from being pushed through the upper section, and guide means secured to the end of the lower section within the intermediate section and consisting of two U-shaped members having portions projecting over the side members of the intermediate section.

In testimony whereof I have hereunto set my hand in presence of two subscribing witnesses.

CHAS. N. LEONARD

Witnesses:
CHARLES KOEHRING,
E. C. MONROE.